UNITED STATES PATENT OFFICE.

RICHARD ZSIGMONDY, OF JENA, GERMANY.

PROCESS OF PRODUCING COATINGS OF METALLIC LUSTER ON CERAMIC OBJECTS, &c.

SPECIFICATION forming part of Letters Patent No. 682,310, dated September 10, 1901.

Application filed November 8, 1900. Serial No. 35,884. (No specimens.)

*To all whom it may concern:*

Be it known that I, RICHARD ZSIGMONDY, doctor of philosophy, a subject of the Emperor of Austria-Hungary, residing at Jena, No. 1 Blumenstrasse, in the Grand Duchy of Saxe-Weimar, German Empire, have invented a new and useful Process of Producing Coatings of Metallic Luster on Ceramic Objects, Enamels, Glasses, Base Metals, and the Like, of which the following is a specification.

The process hereinafter described has been elaborated on the basis of the observation that a rather thin layer of reduced silver obtained by heat from a solution of resinate of silver is already opaque and of a high reflecting power. These two properties appear even when a considerable quantity of oxids of other metals is embedded among the particles of reduced silver.

While luster-gold must contain ten to twelve per cent. of metallic gold for giving, after being burned in, an opaque coating on porcelain and the like, a combination of a solution of resinate of silver and a solution of resinate of bismuth containing only 1.5 to three per cent. of metallic silver when laid on in the same thickness as the luster-gold leaves a coating, which is completely opaque and glitters in a silver to platinum luster. Therefore the present invention presents a cheap way to produce a metallic luster on ceramic objects, as well as to prepare luster-metals, which compared with those hitherto in use is distinguished by the slight percentage of the precious metals, (gold, platinum, and the like.) However, the reduced silver resulting from the process described is not fireproof and when burned in, as usual, in muffles loses its luster, partly by oxidation and partly by molecular variation.

In order to elaborate a useful process on the basis of the above-stated facts, at first the following problems were to be solved: first, to prevent the reduced silver from losing its luster; second, for the purpose of imitating metals or alloys which reflect yellow or yellowish green or red to modify the silver luster by suitable additions, and, third, to make the coatings sufficiently adhere to the objects. All these requirements can be fulfilled by employing preparations hereinafter described and by deviating from the common process of burning in the luster metals in muffle-furnaces under red heat in this way that the temperature is lowered so as to remain, while differing for each single preparation between 340° and 480° centigrade.

(A) A preparation for a silver to platinum luster is attained by mixing fifteen parts of a solution of resinate of bismuth, including 5.35 per cent. $Bi_2O_3$, one hundred parts of a 3.4 percentage solution of silver, and four parts of a solution of boric acid in benzylic alcohol.

The solution of silver is prepared as follows: Three grams sulfur and thirty grams colophony are heated to 270° centigrade and the product of reaction solved in seventy cubic centimeters absolute alcohol. To this solution a solution of six grams nitrate of silver ($AgNO_3$) in six cubic centimeters water is added. Thereupon the mixture is heated on the water-bath for half an hour and then poured into water. The argentiferous resin precipitated thereby is washed in hot water, dried, and solved in lavender-oil. The preparation is employed at a temperature of 360° to 380° centigrade. An addition of trading luster-platinum to this preparation enables the reduced silver to resist the influence of sulfid of hydrogen.

(B) When mixing pure solutions of sulfureted resinates of gold and silver in essential oils, the silver luster prevails, and the color of the resulting coating is silvery white when the proportion was one part Au to one part Ag, yellowish white when the proportion was three parts Au to one part Ag, and light yellow when the proportion was six parts Au to one part Ag. Indeed the color of gold scarcely becomes visible, especially when less than six per cent. of it is contained in the mixture. Moreover, the thin metallic layer allows to be wiped away with a piece of cloth; but the said mixtures may be highly improved, so as to gain a yellow metallic luster of the most various shades by embedding suitable metallic oxids among the particles of the reduced gold and silver. Thus are attained with mixtures containing solutions of gold and silver and bismuth at the proportion of six parts Au to one part Ag to four to six parts $Bi_2O_3$ a bronze luster, six parts Au to one part Ag to three parts $Bi_2O_3$ a yellow luster, three parts Au to one part Ag to two parts $Bi_2O_3$ a yellowish-green gold luster, and one part Au to one part Ag to one part $Bi_2O_3$ a greenish metallic luster. For these mixtures a less-than-six-percentage solution of gold may be used. In most cases even 2.5 to five per cent. will satisfy to attain coatings which are as opaque as those obtained with the luster-gold hitherto used in gilding ceramic articles, which contains at least nine to ten per cent. of gold. When the said preparations are laid on in a thinner layer and certain temperatures are applied, luster colors playing in different shades can be attained. For instance, by a mixture containing three Au to one Ag to two $Bi_2O_3$ and in a very thin layer burned in at 440° centigrade various red reflections similar to those of Moorish faiences are produced. An addition of a solution of boric acid in benzylic alcohol, $1B(OH)_3$, to ten benzylic alcohol, boiled until the water is expelled, heightens the durability and shades the color more to yellow. For the purpose of greater durability also a solution of phosphoric acid prepared in a similar manner may be employed instead of the solution of boric acid.

Other oxids may be used instead of the oxid of bismuth; but they will in most cases produce less good effects.

*Process of decoration.*—The here-described preparations can be applied to the objects to be decorated like usual luster-gold or luster colors. The manner of burning in, however, is quite different therefrom. While hitherto bepainted earthenwares and the like were burned at an intense heat, in the present process a comparatively low temperature should not be exceeded. The low temperature renders the working simple, for now the most wares without, as formerly, being previously heated may directly be brought into the room heated to the required temperature, and as the reduction of the metals takes place rather quickly all wares after a short time can be transmitted into the cooling-room. By the omittance of the preliminary heating of the articles and by the reduction of the burning temperature also fuel is saved, and, further, the low temperature may be produced by fire-gases which escape from a furnace serving for other purposes. Moreover, there is no more need to arrange the wares to be burned in layers within a narrow room, so that differences of temperature occur from one layer to the other and the outer parts run the risk of being overheated. On the contrary, the wares can be introduced into the furnace separately or lying one beside the other—for instance, on a wide endless ribbon. Also base metals—for instance, iron—even when oxidized on their surface, can be provided according to this process with a coating of metallic luster without previously removing the oxid layer, (which in the case of galvanic gilding by all means must be done;) but it will be understood that although very fast adhering to the base the metallic layer offers no protection against an afterward oxidation. Moreover, enameled sheet-iron and the like can also be provided with a coating of metallic luster.

What I claim as my invention, and desire to secure by Letters Patent, is—

1. A process of producing coatings of metallic luster on ceramic objects, enamels, glasses, base metals, and the like, which process consists in applying to the objects to be decorated an argentiferous organic fluid, which is similar to the luster colors and contains less than seven per cent. of precious metals, and then heating the objects to a temperature between 340° and 480° centigrade, essentially as described.

2. A process of producing coatings of grayish-white metallic luster on ceramic objects, enamels, glasses, base metals, and the like, which process consists in applying to the objects to be decorated an argentiferous organic fluid which, comprising compounds of silver, of bismuth, and of boric acid, dissolved in essential oils, is similar to the luster colors and contains less than seven per cent. of precious metals, and then heating the objects to a temperature between 340° and 480° centigrade, essentially as described.

3. A process of producing coatings of yellow, greenish-yellow and red metallic luster on ceramic objects, enamels, glasses, base metals, and the like, which process consists in applying to the objects to be decorated an argentiferous organic fluid which, comprising a mixture of organic solutions of silver, gold and bismuth in the proportions of one part of silver to one to eight parts of gold and one part of gold to 0.45 to three parts of oxid of bismuth, is similar to the luster colors and contains less than seven per cent. of precious metals, and then heating the objects to a temperature between 340° and 480° centigrade, essentially as described.

In testimony whereof I have signed my name to this specification in the presence of two subscribing witnesses.

RICHARD ZSIGMONDY.

Witnesses:
PAUL KRÜGER,
MAX BECKER.